US010969833B2

(12) United States Patent
Cheng (10) Patent No.: US 10,969,833 B2
(45) Date of Patent: Apr. 6, 2021

(54) METHOD AND APPARATUS FOR PROVIDING A THREE-DIMENSIONAL DATA NAVIGATION AND MANIPULATION INTERFACE (75) Inventor: Peng Cheng, Copenhagen SV (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 13/089,870

(22) Filed: Apr. 19, 2011

(65) Prior Publication Data
US 2012/0271545 A1    Oct. 25, 2012

(51) Int. Cl.
G06F 9/48      (2006.01)
G06F 1/16      (2006.01)
G06F 3/0483    (2013.01)
G06F 3/0481    (2013.01)
G06F 3/0488    (2013.01)

(52) U.S. Cl.
CPC ............ G06F 1/169 (2013.01); G06F 1/1692 (2013.01); G06F 3/0483 (2013.01); G06F 3/0488 (2013.01); G06F 3/04815 (2013.01); G06F 2203/0339 (2013.01)

(58) Field of Classification Search
CPC .... G06F 3/04883; G06F 3/017; G06F 3/0481; G06F 1/169; G06F 3/04815; G06F 1/1692; G06F 3/0483; G06F 3/0488; G06F 2203/0339
USPC .................................. 715/863, 702; 345/173
See application file for complete search history.

(56) References Cited

U.S. PATENT DOCUMENTS

| 5,335,557 A | 8/1994 | Yasutake |
| 7,716,604 B2 * | 5/2010 | Kataoka et al. ............... 715/835 |
| 7,965,902 B1 * | 6/2011 | Zelinka .................... G06T 17/05 |
| | | 382/284 |

(Continued)

FOREIGN PATENT DOCUMENTS

| EP | 1 926 294 A1 | 5/2008 |
| EP | 2112585 A1 | 10/2009 |

(Continued)

OTHER PUBLICATIONS

International Search Report and Written Opinion for Application No. PCT/IB2012/051980 dated Oct. 2, 2012.

(Continued)

Primary Examiner — Jennifer N To
Assistant Examiner — Kc Chen
(74) Attorney, Agent, or Firm — Alston & Bird LLP (57) ABSTRACT Various methods for providing a multi-dimensional data interface are provided. One example method may include receiving first data navigation instructions for navigating data in a first dimension or a second dimension via a first user interface device, causing a presentation of the data to be modified within the first dimension or the second dimension in response to at least receiving the first data navigation instructions, receiving second data navigation instructions for navigating the data in a third dimension via a second user interface device, and causing the presentation of the data to be modified within a third dimension in response to at least receiving the second data navigation instructions. Similar and related example methods, example apparatuses, and example computer program products are also provided.

9 Claims, 9 Drawing Sheets (56) References Cited

U.S. PATENT DOCUMENTS

| | | | | |
|---|---|---|---|---|
| 8,055,305 | B2* | 11/2011 | Cho et al. | 455/566 |
| 8,064,704 | B2* | 11/2011 | Kim | G06F 3/017 |
| | | | | 382/100 |
| 8,239,784 | B2* | 8/2012 | Hotelling et al. | 715/830 |
| 8,271,898 | B1* | 9/2012 | Mattos et al. | 715/784 |
| 8,860,672 | B2* | 10/2014 | Ewing, Jr. | G06F 1/1686 |
| | | | | 345/173 |
| 2005/0034084 | A1* | 2/2005 | Ohtsuki et al. | 715/864 |
| 2005/0184953 | A1* | 8/2005 | Camp et al. | 345/156 |
| 2006/0026535 | A1 | 2/2006 | Hotelling et al. | |
| 2008/0016451 | A1* | 1/2008 | Funabashi | H04M 1/72544 |
| | | | | 715/757 |
| 2008/0172611 | A1 | 7/2008 | Karlberg et al. | |
| 2009/0298537 | A1 | 12/2009 | Choi | |
| 2010/0211872 | A1 | 8/2010 | Rolston et al. | |
| 2011/0087963 | A1* | 4/2011 | Brisebois et al. | 715/702 |
| 2012/0066591 | A1* | 3/2012 | Hackwell | G06F 3/03547 |
| | | | | 715/702 |

FOREIGN PATENT DOCUMENTS

| | | |
|---|---|---|
| EP | 2 192 750 A2 | 6/2010 |
| EP | 2 254 313 A1 | 11/2010 |
| EP | 2 254 314 A1 | 11/2010 |
| EP | 2 309 768 A2 | 4/2011 |

OTHER PUBLICATIONS

Extended European Search Report for corresponding European Application No. 12773700.5 dated Dec. 4, 2014, 8 pages.

Office Action for Taiwanese Application No. 101113786 dated Jul. 9, 2014.

Notice of Allowance for Taiwanese Application No. 101113786 dated Jun. 3, 2015.

Office Action for corresponding European Application No. 12773700.5, dated Apr. 6, 2017, 6 pages.

* cited by examiner

METHOD AND APPARATUS FOR PROVIDING A THREE-DIMENSIONAL DATA NAVIGATION AND MANIPULATION INTERFACE

TECHNICAL FIELD

Various embodiments relate generally to user interface functionality, and, more particularly, relate to a method and apparatus for providing a multi-dimensional data interface.

BACKGROUND

As computing and communications devices become increasingly more dynamic and convenient, users of the devices have become increasingly reliant on the functionality offered by the devices in a variety of settings. Due to advances made in screen technologies, and other user interface input devices and hardware, users continue to demand more convenient and intuitive user interfaces. To meet the demands of users or encourage utilization of new functionality, innovation in the design and operation of user interfaces must keep pace.

SUMMARY

Example methods, example apparatuses, and example computer program products are described herein that provide a multi-dimensional data interface. One example method may include receiving first data navigation instructions for navigating data in a first dimension or a second dimension via a first user interface device, and causing a presentation of the data to be modified within the first dimension or the second dimension in response to at least receiving the first data navigation instructions. The example method may also include receiving second data navigation instructions for navigating the data in a third dimension via a second user interface device, and causing the presentation of the data to be modified within a third dimension in response to at least receiving the second data navigation instructions.

An additional example embodiment is an apparatus configured to provide a multi-dimensional data interface. The example apparatus may comprise at least one processor and at least one memory including computer program code, where the at least one memory and the computer program code are configured to, with the at least one processor, cause the apparatus to perform various functionalities. In this regard, the example apparatus may be caused to receive first data navigation instructions for navigating data in a first dimension or a second dimension via a first user interface device, cause a presentation of the data to be modified within the first dimension or the second dimension in response to at least receiving the first data navigation instructions, receive second data navigation instructions for navigating the data in a third dimension via a second user interface device, and cause the presentation of the data to be modified within a third dimension in response to at least receiving the second data navigation instructions.

Another example embodiment is a computer program product comprising at least one non-transitory computer readable medium having computer program code stored thereon, wherein the computer program code, when executed by an apparatus (e.g., one or more processors), causes an apparatus to perform various functionalities. In this regard, the program code may cause the apparatus to receive first data navigation instructions for navigating data in a first dimension or a second dimension via a first user interface device, cause a presentation of the data to be modified within the first dimension or the second dimension in response to at least receiving the first data navigation instructions, receive second data navigation instructions for navigating the data in a third dimension via a second user interface device, and cause the presentation of the data to be modified within a third dimension in response to at least receiving the second data navigation instructions.

Another example apparatus comprises means for receiving first data navigation instructions for navigating data in a first dimension or a second dimension via a first user interface device, means for causing a presentation of the data to be modified within the first dimension or the second dimension in response to at least receiving the first data navigation instructions, means for receiving second data navigation instructions for navigating the data in a third dimension via a second user interface device, and means for causing the presentation of the data to be modified within a third dimension in response to at least receiving the second data navigation instructions.

BRIEF DESCRIPTION OF THE DRAWINGS

Having thus described some example embodiments in general terms, reference will now be made to the accompanying drawings, which are not necessarily drawn to scale, and wherein:

DETAILED DESCRIPTION

Example embodiments will now be described more fully hereinafter with reference to the accompanying drawings, in which some, but not all embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Further, the term "or" as used herein is not used in an exclusive manner (i.e., as an exclusive-or), but is defined as an operator that includes at least one option in a collection, and possibly one or more other options within the collection.

As used herein, the term 'circuitry' refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

According to various example embodiments, methods and apparatuses are provided that support a multi-dimensional data interface. In this regard, according to some example embodiments, an apparatus is described that supports the ability to interact with data in three dimensions on a handheld electronic device, such as mobile phone (e.g., smart phone), media player, media tablet/pad, or the like. The electronic device may include at least two user interface devices that may be used for navigating data in three dimensions. According to some example embodiments, a first user interface device may be a touch screen display. The touch screen display may be configured to receive, and relay to a processor, data navigation instructions provided by a user for interaction with data relative to a first dimension and a second dimension (e.g., the x and y dimensions). Further, the electronic device may include a second user interface device, which may, according to some example embodiments, be in the form of a touch sensitive stripe that is disposed on a side edge or back face of the electronic device. The touch sensitive stripe may be configured to receive, and relay to a processor, data navigation instructions provided by a user for interaction with data relative to a third dimension (e.g., the z dimension).

Via these user interface devices, a user may be able to navigate data in three dimensions, thereby enabling the user, according to some example embodiments, to interface with complex collections of data in an intuitive manner. The navigation of data in three dimensions as described herein may be applied in a number of implementation formats and applications. For example, three dimensional data navigation (that includes a "depth" dimension) may be performed within a three-dimensional gaming environment, within a three-dimensional rendering of a database table structure, with respect to a reader application where navigation of data with respect to depth is associated with turning pages forward to backward in a book or magazine. Further, geo-mapping applications that provide a street view-type feature may support three-dimensional navigation to permit virtual movement within the rendered environment.

As a result of such an interface, according to various example embodiments, data may be organized without being limited to two-dimensional presentations (e.g., scrollable lists and the like), but rather three-dimensional presentations of data may be used that add an element of, for example, "depth" to the presentation of data. Additionally, according to some example embodiments, utilization of the data navigation instructions via a second user interface device (e.g., a touch sensitive stripe) may offer an alternative to some two-dimensional gestures (e.g., pinch to zoom) that attempt to provide to the ability to navigate data in a third dimension.

Figure 8:
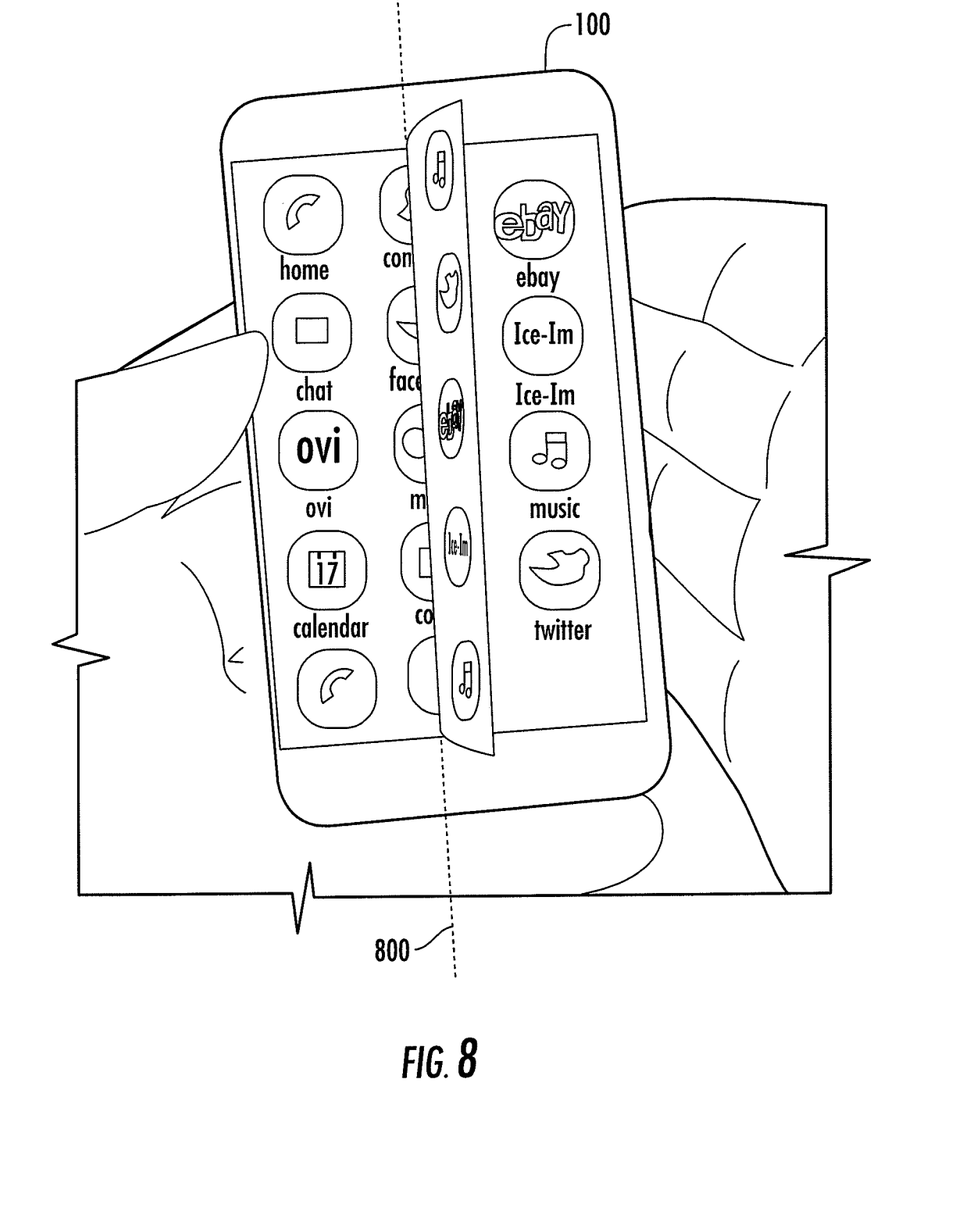
FIG. 8 illustrates an example implementation of a virtual flip board.

Another example implementation of three-dimensional navigation, where a depth aspect is present, is a virtual flip board implementation as depicted in FIG. 8. The electronic device 100 may be instructed, via the second user interface device (e.g., a touch sensitive stripe) on the right edge of the electronic device 100 to flip or page through a series of displayed objects (e.g., pages). As one page is turned, another is exposed, revealing more information behind the original page. This gives the impression that the interaction includes an aspect of depth. Repeated or continual movement by the user can result in the turning of multiple pages. As the user interacts with the second user interface device (as further described below), the pages are turned by depicting each page as pivoting about a flip axis 800. In the example embodiment depicted in FIG. 8, the flip axis is oriented vertically and central to the display screen. However, other placements of the flip axis 800 are contemplated, such as, for example, on an edge of the display screen, and/or in a horizontal or diagonal orientation. The use of the virtual flip board, for example as depicted in FIG. 8, may be applied in a web browser application to turn between web pages (e.g., as an alternative to tabbed webpages), in a digital reader application for reading books, magazines, and the like, or in a photo album application to flip though a collection of photos.

Figure 1A:
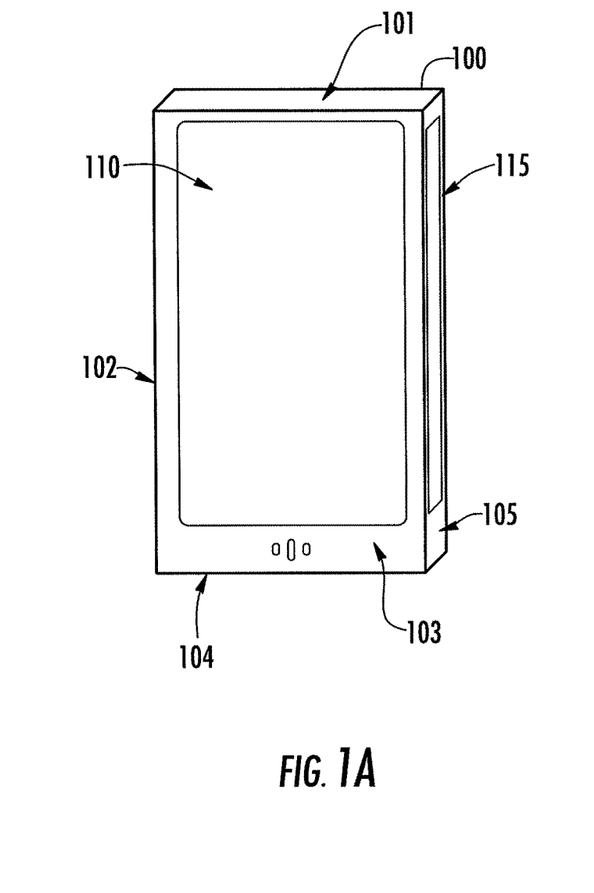
FIGS. 1A, 1B, and 1C illustrate an example electronic device that provides a multi-dimensional data interface according to some example embodiments.

FIG. 1A illustrates an example electronic device 100 that includes two user interface devices to support three-dimensional data navigation. The electronic device 100 may be a mobile phone (e.g., smart phone), media player, media tablet/pad, or the like. As depicted and oriented in the FIG. 1A, the housing of the electronic device may have a top edge 101, a left side edge 102, a front face 103, a bottom edge 104, a right side edge 105, and a back face 106 (opposite the front face 103). The electronic device 100 may include a first user interface device, that is, for example, in the form of a touch screen display 110 that is disposed on the front face 103. The touch screen display 110 may be configured to detect touch or hover events as a user's finger (e.g., thumb, index finger, or the like) or a pointing device comes into proximity (e.g., contact) with the touch screen display. The touch screen display may be constructed based on capacitive sensing, resistive sensing, acoustic wave sensing, or similar technologies. Accordingly, the touch screen display may be configured to detect the user interaction with the display within a plane defined by the front face 103 of the electronic device. In this regard, a user may interact with the touch screen display 110 to cause movement of, or other interactions with, displayed objects within the plane, and the two dimensions, defined by the front face 103.

Figure 1B:
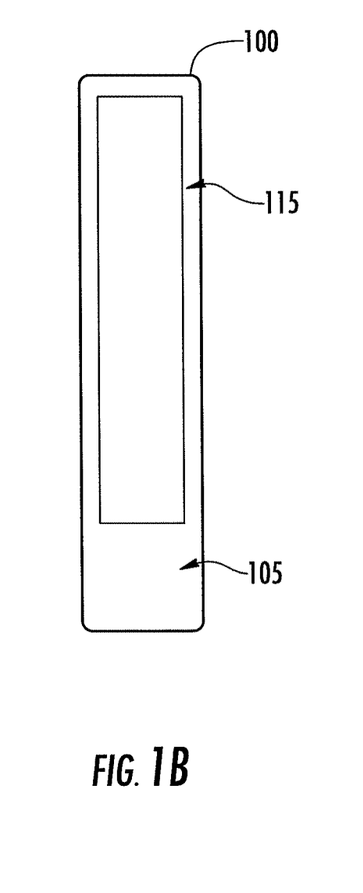
Figure 1C:
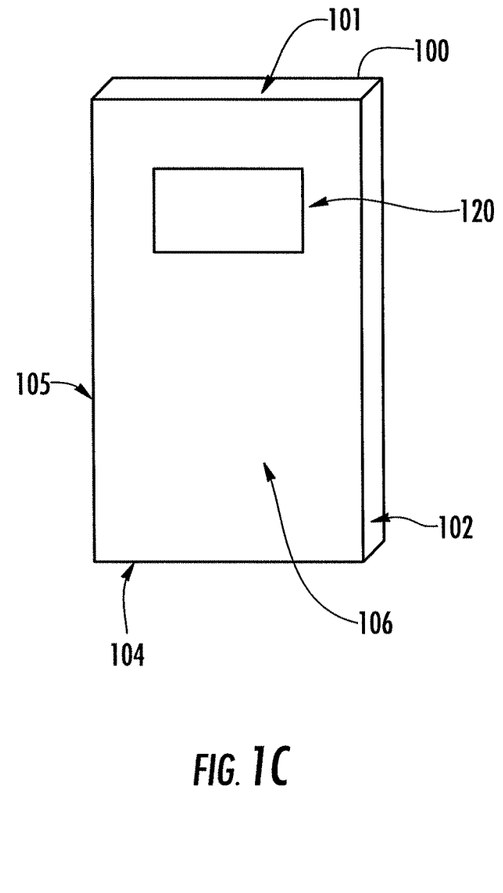

The electronic device 100 may also include at least a second user interface device, that is, for example, in the form of a touch sensitive stripe 115. The touch sensitive stripe 115 may be disposed on a right side edge 105 of the electronic device 105 (as depicted in FIG. 1B), although other additional or alternative edges may include a touch sensitive strip. In this regard, as depicted in FIG. 1C, the electronic device 100 may, alternatively or additionally, include a touch sensitive stripe 120 on the back face 103 of the electronic device 100. The touch sensitive stripe, or a similarly positioned second user interface device, may be configured to receive and provide user inputs as described herein with respect to the touch sensitive stripe 115, although the touch sensitive stripe 120 is oriented differently due to being affixed to the back face of the electronic device. The touch sensitive stripes 115 and 120 may also be constructed using capacitive sensing, resistive sensing, acoustic wave sensing, or similar technologies.

Touch sensitive stripe 115 may be configured to at least detect user interaction with the stripe in directions that are orthogonal to the plane defined by the front face 103 (e.g., in directions that are oriented into the display 110 or out of the display 110). According to some example embodiments, a user may move the palm of her hand across the touch sensitive stripe 115 moving from the front face 103 toward the bottom face, or the reverse, to provide data navigation instructions relative to a third dimension. (See FIG. 2A, which illustrates the positioning and movement of a right hand 205 to provide data navigation instructions relative to a third dimension.) Based on the data navigation instructions provided and received via the touch screen display 110 and the touch sensitive stripe 115, the presentation of data may be modified in three dimensions. In contrast, touch sensitive stripe 120 may be configured to receive user navigation instructions in response to user interaction in a second plane, where the second plane is substantially parallel to the first plane and defined by a second surface of the electronic device (e.g., the back face).

While FIG. 1A illustrates the second user interface device as the touch sensitive stripe 115, it is contemplated that many other user interface devices may be used in lieu of a touch sensitive stripe. For example, a roller wheel may alternatively be disposed on an edge of the electronic device 100 to provide data navigation instructions relative to a third dimension. Alternately, a trackball, optical trackpad, two-way slider, or a series of buttons (e.g., a two or multi-direction rocker button) may be utilized.

Figure 2A:
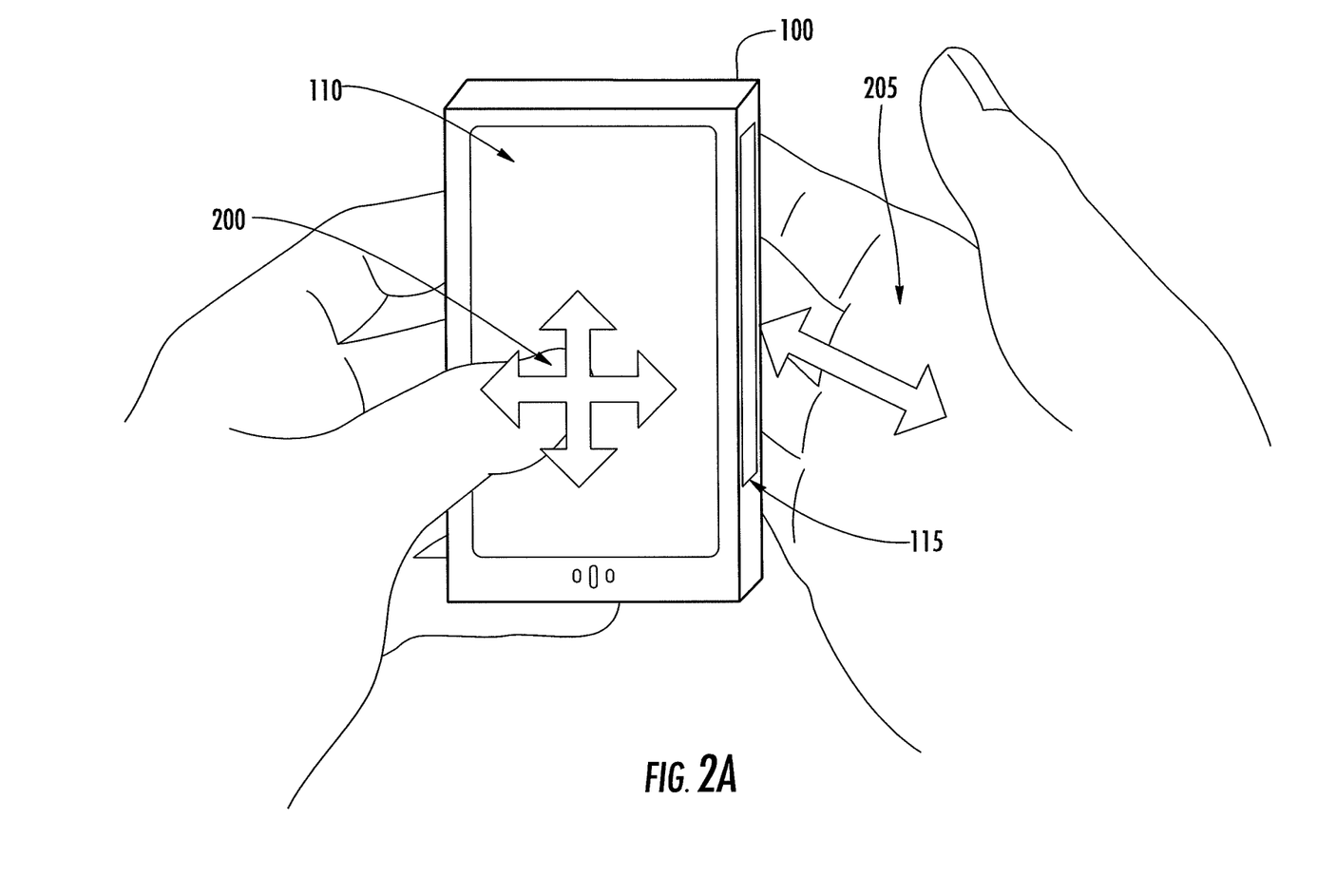
FIGS. 2A and 2B illustrate example handlings of, and user interaction with, an electronic device in accordance with some example embodiments.

FIG. 2A illustrates how the electronic device 100 may be handled and utilized according to various example embodiments. In FIG. 2A, the user is holding the electronic device 100 with her left hand, and is therefore able to provide data navigation instructions in first or second dimensions via movement and interaction of the user's thumb 200. The four direction arrow indicates that the touch screen display is configured to receive the data navigation instructions in the first or second dimensions defined by a plane of the front face of the electronic device 100. The user's right hand 205 is then free interact with the touch sensitive stripe in a direction into and out of the plane defined by the front face of the electronic device (as indicated by the two direction arrow). As such, in response to interaction between the user's right hand 205 and the touch sensitive stripe 115, a presentation of data may be modified relative to a third dimension (e.g., the depth of the presentation may be modified). Further, the electronic device may be configured to be responsive to simultaneous interaction with both the touch screen display and the touch sensitive stripe. For example, a user may move a cursor in the z direction while simultaneously moving in the cursor in an xy direction to achieve simultaneous three-dimensional movement. This technique may also be implemented in gaming applications to permit movement into or out of the screen using the touch sensitive stripe, while simultaneously steering a rendered object via interaction with the touch screen display.

Figure 2B:
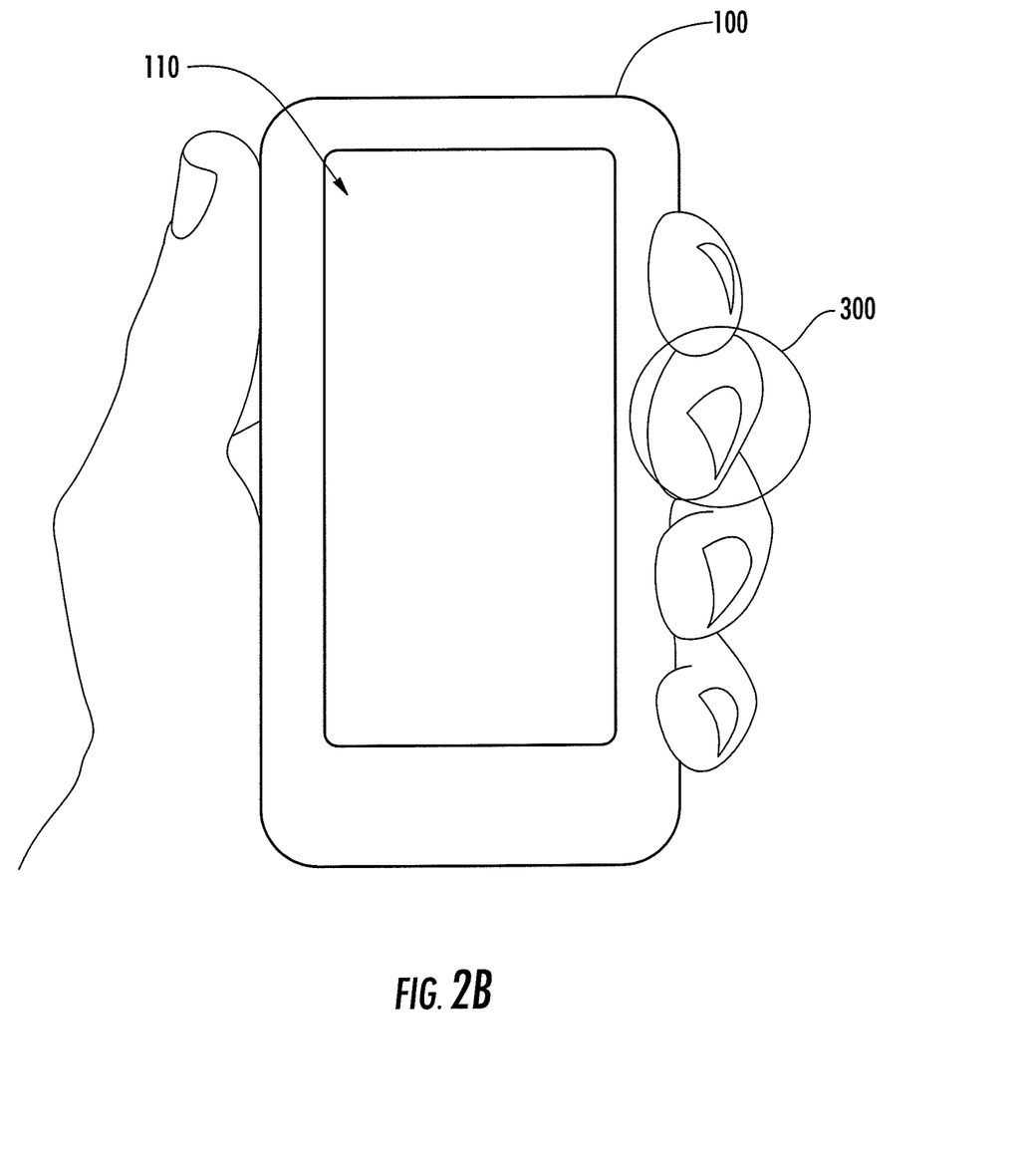

FIG. 2B illustrates an alternative handling of the electronic device 100 with a single hand. In this regard, the user may grip the electronic device 100 such that the user's thumb may still interact with the touch screen display 110, but at least one of the user's other fingers may be positioned to interface with the touch sensitive stripe. For example, the user's finger at 300 may swipe forward or backward across the touch sensitive stripe to provide data navigation instructions relative to a third dimension.

Being able to navigate data in three dimensions may permit number of data presentation capabilities to be implemented. For example, according to some example embodiments, a user may be able to navigate a page of a magazine or book in two dimensions using a first user interface device (e.g., a touch screen display), but change pages forwards or backwards via interaction with the second user interface device (e.g., the touch sensitive stripe). Similarly, photos may be browsed in the same manner where interaction with the second user interface device moves between photos in a collection. Also, data navigation instructions received via the second user interface device may permit flipping through webpages or switching between active tasks being implemented by the electronic device 100. Further, data navigation instructions received via the second user interface device may permit image or other data to be digitally zoomed in and out. Alternatively, if a user has implemented a mapping application that uses a street view perspective, interaction with the first user interface device may permit a user to change the direction of her view frame (e.g., permit the user to look around from the same location), while interaction with the second user interface device may permit a user to move (e.g., walk) forward or backward to change the location from which the surroundings are viewed. Additionally or alternatively, in some example embodiments, the instructions received from the first and second user interface devices may select or define a data point or grid point within a three dimensional image or other presentation that can subsequently be rotated about the selected data point in any direction. Further, in other example embodiments, the use of three dimensional image interaction may be utilized to, for example, modify the shape of a three-dimensional rendered object. In this regard, a point on a three-dimensional object may be selected and that point may be manipulated in three-dimensions to change the shape of the object, thereby enabling virtual clay or three-dimensional sculpting applications and techniques.

Figure 3:
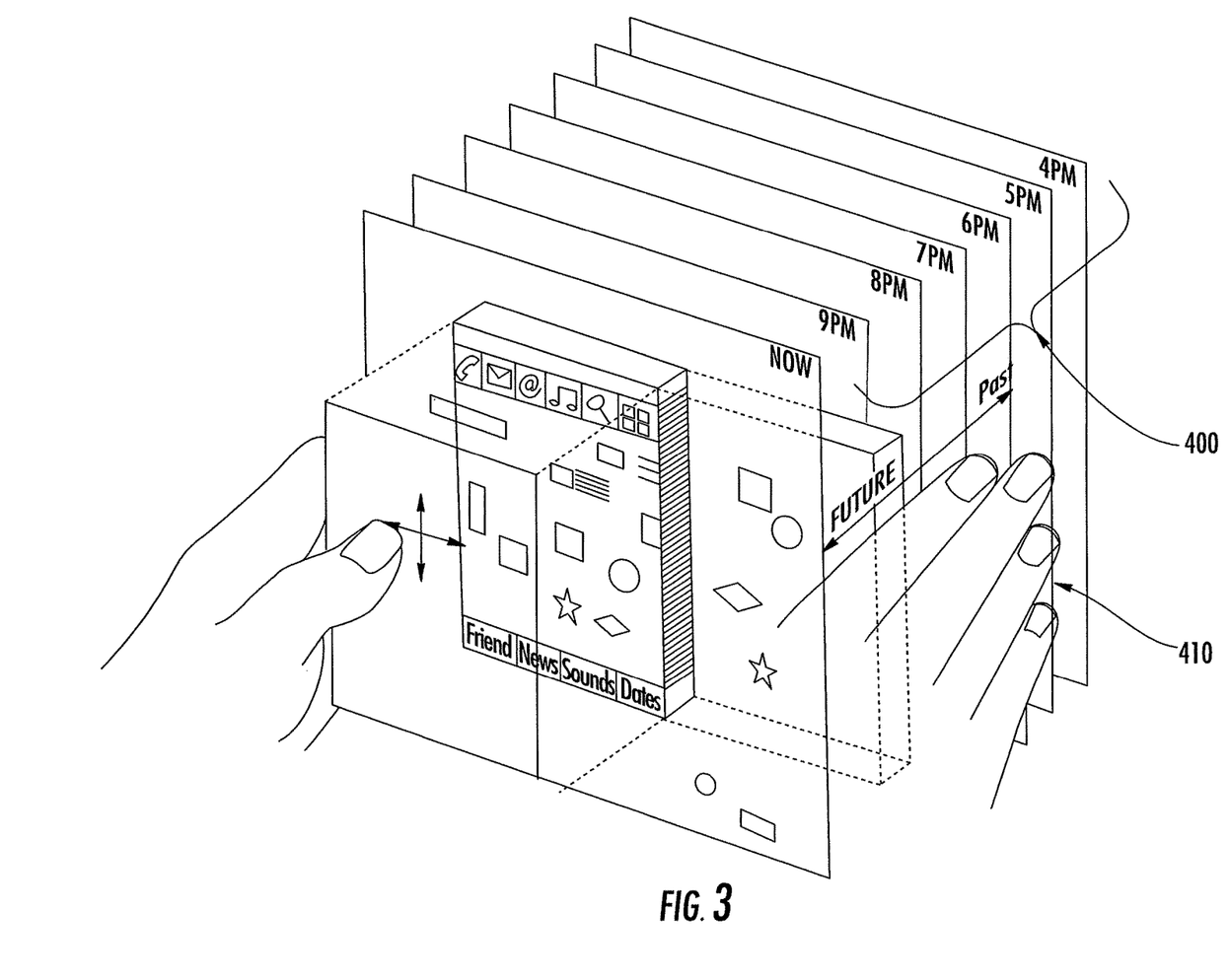
FIG. 3 illustrates a visualization of interaction with a time-based application according to an example embodiment.

Being able to navigate data in three dimensions, also permits data to be presented where the third dimension is time. FIG. 3 illustrates one example application and virtual representation of the ability to navigate through time using the data navigation instructions received via a second user interface device. In FIG. 3, the user is able to navigate within a given temporal unit (e.g. month, day, time, etc.) via navigation instructions received via a first user interface device. However, the electronic device is also configured to support the presentation of movement through time (e.g., into the past or into the future) via navigation instructions received via a second user interface device. In this regard, FIG. 3 illustrates the virtual appearance of moving through temporal units 400 via movement of the user's right hand 410 to interact with the second user interface device that causes the presented temporal unit to change with respect to time (also referred to as movement through a time tunnel).

Figure 4:
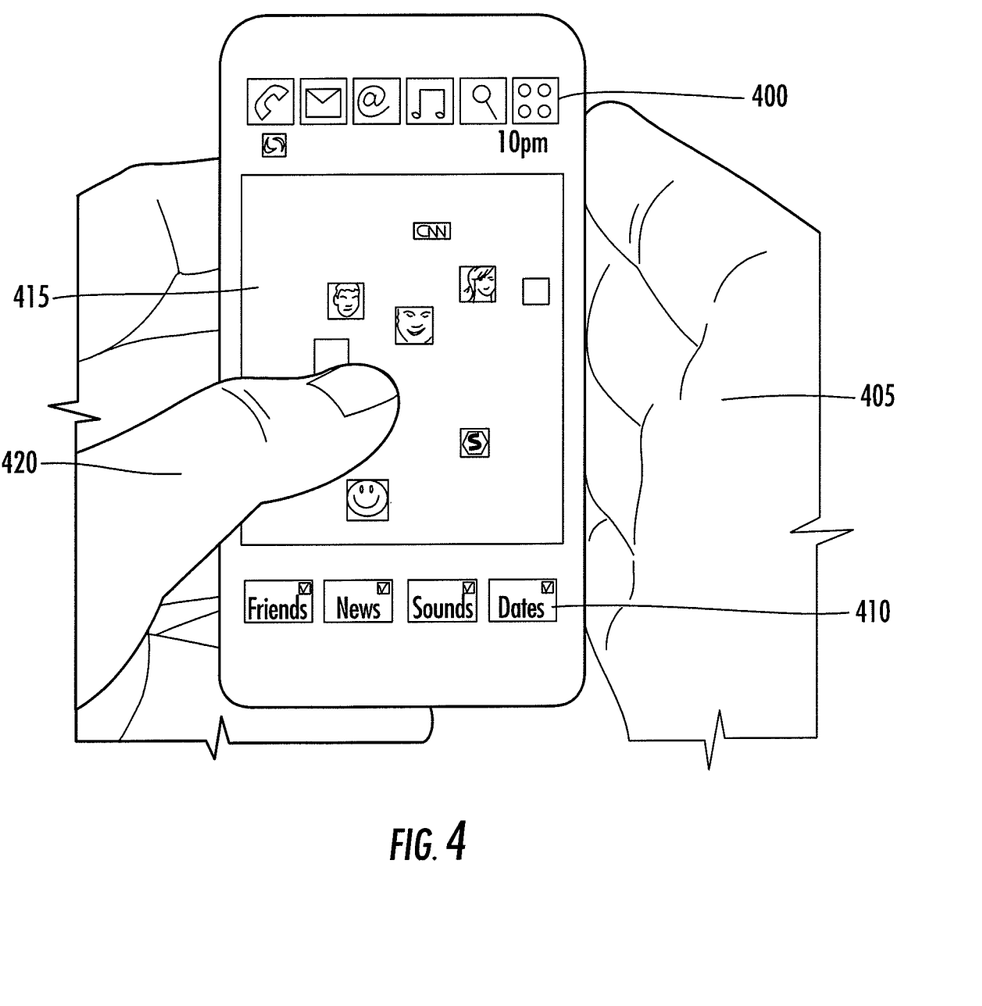
FIG. 4 illustrates another handling of, and interaction with, an electronic device configured to perform a relevancy analysis according to an example embodiment.

According to various example embodiments, the information presented with respect to a particular temporal unit may be defined based on a calculated relevance of the information with respect to the temporal unit. For example, calendar events for the temporal unit may be presented with photos taken during the temporal unit, messages received or sent during the temporal unit, or the like. FIG. 4 illustrates another example handling of an electronic device that is configured perform a temporal relevance analysis and permit movement through time via interaction between the user's right hand 405 and a second user interface device on the right side edge of the electronic device (as described above). Icons at 400 may be shortcuts to frequently-used applications and access to a main menu. Icons at 410 may be defined as relevance categories for selection to change (e.g., broaden or lessen) the information being presented. The touch screen display may be configured to receive navigation instructions in two dimensions via interaction with and movement by the user's thumb 420. The presentation of information on the display at 415 may be configured such that the positioning of the objects on the screen is based on the objects' relevance. In this regard, for example, the most relevant objects may be positioned near or at the center of the presentation area.

Figure 5:
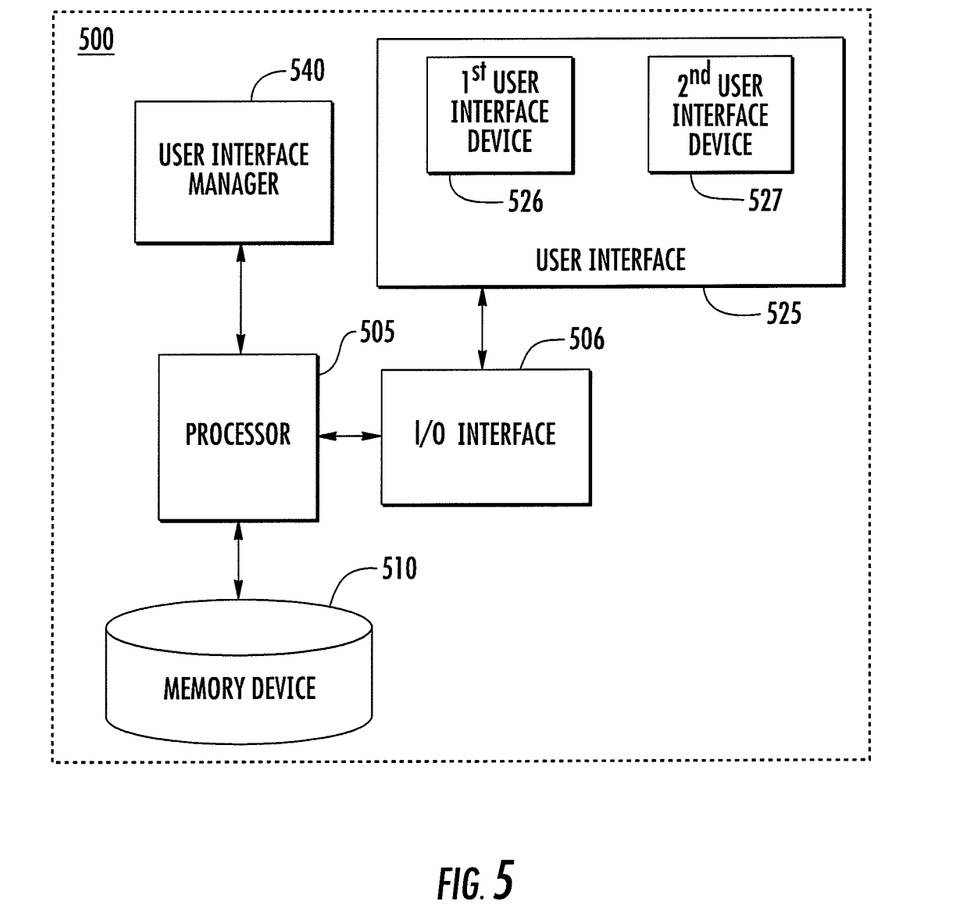
FIG. 5 illustrates a block diagram of an apparatus that is configured to provide a multi-dimensional data interface according to an example embodiment.
Figure 6:
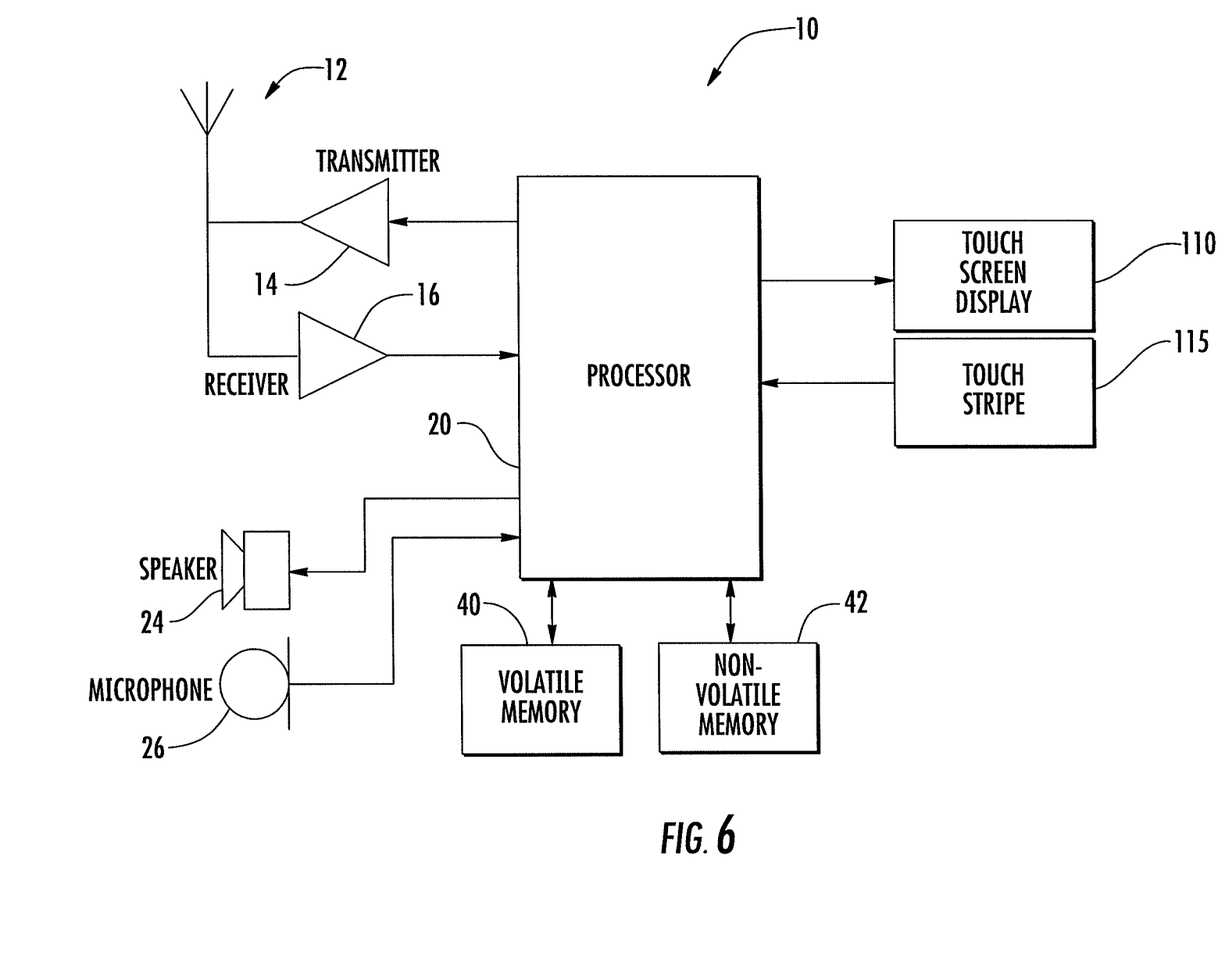
FIG. 6 illustrates a block diagram of a mobile device configured to provide a multi-dimensional data interface according to an example embodiment.
Figure 7:
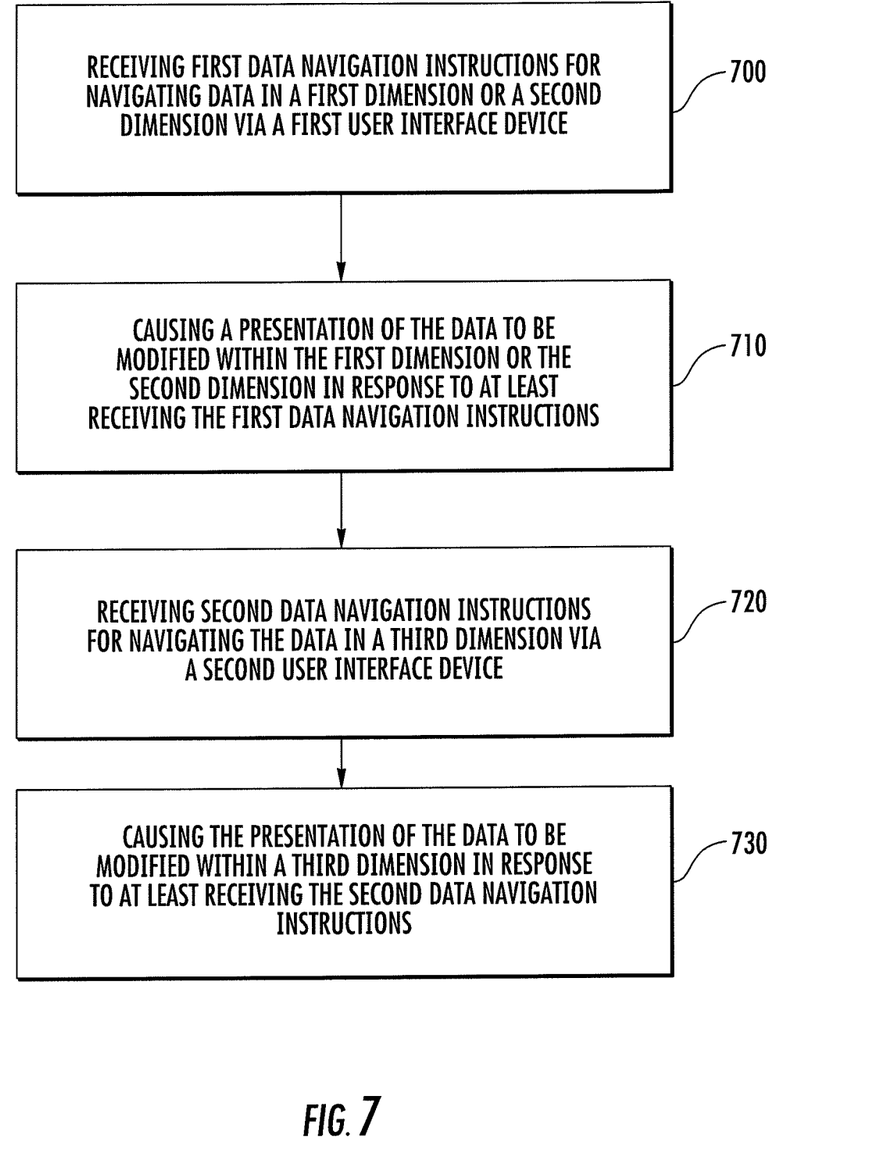
FIG. 7 illustrates a flow chart of an example method for providing a multi-dimensional data interface according to some example embodiments

Having described some example embodiments above, FIGS. 5 and 6 depict example apparatuses that may be configured to perform various functionalities as described herein, including those described with respect to FIGS. 1A through 4. Additionally, FIG. 7 illustrates an example method or algorithm that may be performed by the apparatuses of FIGS. 5 and 6, and incorporate the various features and functionalities described herein.

Referring now to FIG. 5, an example embodiment is depicted as apparatus 500, which may be embodied as an electronic device, such as a wireless communications device. In some example embodiments, the apparatus 500 may be part of a mobile electronic device. As a mobile device, the apparatus 500 may be a mobile and/or wireless communications node such as, for example, a mobile and/or wireless server, computer, access point, handheld wireless device (e.g., telephone, tablet/pad device, portable digital assistant (PDA), mobile television, gaming device, camera, video recorder, audio/video player, radio, digital book reader, and/or a global positioning system (GPS) device), any combination of the aforementioned, or the like. Regardless of the type of electronic device, apparatus 500 may also include computing capabilities.

FIG. 5 illustrates a block diagram of example components of the apparatus 500, which may be embodied as a electronic device 100 or a component of the electronic device 100. The example apparatus 500 may comprise or be otherwise in communication with a processor 505, a memory device 510, an Input/Output (I/O) interface 506, a user interface 525, and a user interface manager 540. The processor 505 may, according to some example embodiments, be embodied as various means for implementing the various functionalities of example embodiments including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, processor 505 may be representative of a plurality of processors, or one or more multiple core processors, operating in concert. Further, the processor 505 may be comprised of a plurality of transistors, logic gates, a clock (e.g., oscillator), other circuitry, and the like to facilitate performance of the functionality described herein. The processor 505 may, but need not, include one or more accompanying digital signal processors. In some example embodiments, the processor 505 may be configured to execute instructions stored in the memory device 510 or instructions otherwise accessible to the processor 505. The processor 505 may be configured to operate such that the processor causes or directs the apparatus 500 to perform various functionalities described herein.

Whether configured as hardware or via instructions stored on a computer-readable storage medium, or by a combination thereof, the processor 505 may be an entity and means capable of performing operations according to example embodiments while configured accordingly. Thus, in example embodiments where the processor 505 is embodied as, or is part of, an ASIC, FPGA, or the like, the processor 505 may be specifically configured hardware for conducting the operations described herein and the algorithms described herein. Alternatively, in example embodiments where the processor 505 is embodied as an executor of instructions stored on a computer-readable storage medium, the instructions may specifically configure the processor 505 to perform the algorithms and operations described herein. In some example embodiments, the processor 505 may be a processor of a specific device (e.g., mobile communications device) configured for employing example embodiments by further configuration of the processor 505 via executed instructions for performing the algorithms, methods, and operations described herein.

The memory device 510 may be one or more tangible and/or non-transitory computer-readable storage media that may include volatile and/or non-volatile memory. In some example embodiments, the memory device 510 comprises Random Access Memory (RAM) including dynamic and/or static RAM, on-chip or off-chip cache memory, and/or the like. Further, memory device 510 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), various type of solid-state storage (e.g., flash memory), and/or the like. Memory device 510 may include a cache area for temporary storage of data. In this regard, some or all of memory device 510 may be included within the processor 505. In some example embodiments, the memory device 510 may be in communication with the processor 505 and/or other components via a shared bus. In some example embodiments, the memory device 510 may be configured to provide secure storage of data, such as, for example, the characteristics of the reference marks, in trusted modules of the memory device 510.

Further, the memory device 510 may be configured to store information, data, applications, computer-readable program code instructions and algorithms, and/or the like for enabling the processor 505 and the example apparatus 500 to carry out various functions in accordance with example embodiments described herein. For example, the memory device 510 may be configured to buffer input data for processing by the processor 505. Additionally, or alternatively, the memory device 510 may be configured to store instructions for execution by the processor 505.

The I/O interface 506 may be any device, circuitry, or means embodied in hardware or a combination of hardware and software that is configured to interface the processor 505 with other circuitry or devices, such as the user interface 525. In some example embodiments, the I/O interface may embody or be in communication with a bus that is shared by multiple components. In some example embodiments, the processor 505 may interface with the memory 510 via the I/O interface 506. The I/O interface 506 may be configured to convert signals and data into a form that may be interpreted by the processor 505. The I/O interface 506 may also perform buffering of inputs and outputs to support the operation of the processor 505. According to some example embodiments, the processor 505 and the I/O interface 506 may be combined onto a single chip or integrated circuit configured to perform, or cause the apparatus 500 to perform, various functionalities.

In some embodiments, the apparatus 500 or some of the components of apparatus 500 (e.g., the processor 505 and the memory device 510) may be embodied as a chip or chip set. In other words, the apparatus 500 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 500 may therefore, in some cases, be configured to implement embodiments on a single chip or as a single "system on a chip." As such, in some cases, a chip or chipset may constitute means for performing the functionalities described herein and with respect to the processor 505.

The user interface 525 may be in communication with the processor 505 to receive user input via the user interface 525 and/or to present output to a user as, for example, audible, visual, mechanical, or other output indications. The user interface 525 may include, for example, a keyboard, a mouse, a joystick, a display (e.g., a touch screen display), a microphone, a speaker, camera, accelerometer, or other input/output mechanisms. Further, the processor 505 may comprise, or be in communication with, user interface circuitry configured to control at least some functions of one or more elements of the user interface. The processor 505 and/or user interface circuitry may be configured to control one or more functions of one or more elements of the user interface through computer program instructions (e.g., software and/or firmware) stored on a memory accessible to the processor 505 (e.g., volatile memory, non-volatile memory, and/or the like). The user interface 525 may also be configured to support the implementation of haptic feedback. In this regard, the user interface 525, as controlled by processor 505, may include a vibra, a piezo, and/or an audio device configured for haptic feedback as described herein. In some example embodiments, the user interface circuitry is configured to facilitate user control of at least some functions of the apparatus 500 through the use of a display and configured to respond to user inputs. The processor 505 may also comprise, or be in communication with, display circuitry configured to display at least a portion of a user interface, the display and the display circuitry configured to facilitate user control of at least some functions of the apparatus 500.

The user interface 525 may include at least a first user interface device 526 and a second user interface device 527. According to various example embodiments, the first user interface device 526 may be a touch screen display configured and disposed in the same manner as touch screen display 110. Further, the second user interface device 527 may be a touch sensitive stripe configured and disposed in the same manner as touch sensitive stripe 115.

The user interface manager 540 of example apparatus 500 may be any means or device embodied, partially or wholly, in hardware, a computer program product, or a combination of hardware and a computer program product, such as processor 505 implementing stored instructions to configure the example apparatus 500, memory device 510 storing executable program code instructions configured to carry out the functions described herein, or a hardware configured processor 505 that is configured to carry out the functions of the user interface manager 540 as described herein. In an example embodiment, the processor 505 comprises, or controls, the user interface manager 540. The user interface manager 540 may be, partially or wholly, embodied as processors similar to, but separate from processor 505. In this regard, the user interface manager 540 may be in communication with the processor 505. In various example embodiments, the user interface manager 540 may, partially or wholly, reside on differing apparatuses such that some or all of the functionality of the user interface manager 540 may be performed by a first apparatus, and the remainder of the functionality of the user interface manager 540 may be performed by one or more other apparatuses.

Further, the apparatus 500 and the processor 505 may be configured to perform various functionalities via user interface manager 540. In this regard, the user interface manager 540 may be configured to implement some or all of the operations and functionality described herein. For example, the user interface manager 540 may be configured to implement the functionality described above with respect to FIGS. 1A through 4, and otherwise described above. Further, according to some example embodiments, the user interface manager 540 may be configured to perform the operations described in FIG. 7 and described variations thereof. In this regard, referring to FIG. 7, the user interface manager 540 may be configured to receive, at 700, first data navigation instructions for navigating data in a first dimension or a second dimension via a first user interface device. The first data navigation instructions may be received via the first user interface device in response to user interaction with the first user interface device in a first plane defined by a first surface of an electronic device (e.g., front face). Additionally, the second user navigation instructions may be received via the second user interface device in response to user interaction with a second user interface device in a second plane. The second plane may be substantially orthogonal to the first plane, for example, where the second user interface device is disposed on a side edge of an electronic device. Alternatively, the second plane may be substantially parallel to the first plane and defined by a second surface of the electronic device, such as the back face of the electronic devices. The user interface manager 540 may also be configured to, at 710, cause a presentation of the data (e.g., on the touch screen display) to be modified within the first dimension or the second dimension in response to at least receiving the first data navigation instructions. Further, the user interface manager 540 may also be configured to receive, at 720, second data navigation instructions for navigating the data in a third dimension via a second user interface device, and cause, at 730, the presentation of the data to be modified within a third dimension in response to at least receiving the second data navigation instructions.

According to some example embodiments, the user interface manager 540 may be alternatively or additionally configured to receive the first user navigation instructions via the first user interface device in response to user interaction with the first user interface device in a first plane. Further in this regard, the user interface manager 540 may be configured to receive the second user navigation instructions via the second user interface device in response to user interaction with a second user interface device in a second plane that is substantially orthogonal to the first plane. In this regard, the use of the term "substantially" is intended to cover unintended variations in the relationship that can be attributed to, for example, manufacturing flaws or inconsistencies.

Additionally or alternatively, according to some example embodiments, the user interface manager 540 may be configured to receive the first user navigation instructions via the first user interface device, where the first user interface device is a touch screen display disposed on a front surface (front face) of an electronic device, and configured to receive the second user navigation instructions via the second user interface device, where the second user interface device is a touch sensitive stripe disposed on a side edge surface of the electronic device. Additionally or alternatively, the user interface manager 540 may be configured to cause the presentation of data to be digitally zoomed in or zoomed out in response to at least receipt of the second data navigation instructions or modified with respect to time in response to at least receipt of the second data navigation instructions. Additionally or alternatively, user interface manager 540 may be configured to receive the first data navigation instructions to define a data point with respect to the first and second dimensions, receive the second data navigation instructions to define the data point with respect to the third dimension. Further, in this regard, the user interface manager 540 may be configured to cause the presentation of the data to be rotated about the data point or manipulated at the data point, in response to at least receiving third data navigation instructions.

Referring now to FIG. 6, a more specific example apparatus in accordance with various embodiments is provided. The example apparatus of FIG. 6 is a mobile device 10 configured to communicate within a wireless network, such as a cellular communications network. The mobile device 10 may be configured to perform the functionality of the electronic device 100 or apparatus 500 as described herein. More specifically, the mobile device 10 may be caused to perform the functionality described with respect to FIGS. 1A through 4, 7, and otherwise described above, via the processor 20. In this regard, according to some example embodiments, the processor 20 may be configured to perform the functionality described with respect to the user interface manager 540. Processor 20 may be an integrated circuit or chip configured similar to the processor 505 together with, for example, the I/O interface 506. Further, volatile memory 40 and non-volatile memory 42 may be configured to support the operation of the processor 20 as computer readable storage media.

The mobile device 10 may also include an antenna 12, a transmitter 14, and a receiver 16, which may be included as parts of a communications interface of the mobile device 10. The speaker 24, the microphone 26, touch screen display 110, and the touch sensitive stripe 115 may be included as parts of a user interface.

FIG. 7 illustrate flowcharts of example systems, methods, and/or computer program products according to example embodiments. It will be understood that each operation of the flowcharts, and/or combinations of operations in the flowcharts, can be implemented by various means. Means for implementing the operations of the flowcharts, combinations of the operations in the flowchart, or other functionality of example embodiments described herein may include hardware, and/or a computer program product including a computer-readable storage medium (as opposed to a computer-readable transmission medium which describes a propagating signal) having one or more computer program code instructions, program instructions, or executable computer-readable program code instructions stored therein. In this regard, program code instructions for performing the operations and functions of FIG. 7 and otherwise described herein may be stored on a memory device, such as memory device 510, volatile memory 40, or volatile memory 42, of an example apparatus, such as example apparatus 500 or mobile device 10, and executed by a processor, such as the processor 505 or processor 20. As will be appreciated, any such program code instructions may be loaded onto a computer or other programmable apparatus (e.g., processor 505, memory device 510, or the like) from a computer-readable storage medium to produce a particular machine, such that the particular machine becomes a means for implementing the functions specified in the flowcharts' operations. These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' operations. The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowcharts' operations.

Accordingly, execution of instructions associated with the operations of the flowchart by a processor, or storage of instructions associated with the blocks or operations of the flowcharts in a computer-readable storage medium, support combinations of operations for performing the specified functions. It will also be understood that one or more operations of the flowcharts, and combinations of blocks or operations in the flowcharts, may be implemented by special purpose hardware-based computer systems and/or processors which perform the specified functions, or combinations of special purpose hardware and program code instructions.

Many modifications and other embodiments set forth herein will come to mind to one skilled in the art to which these embodiments pertain having the benefit of the teachings presented in the foregoing descriptions and the associated drawings. Therefore, it is to be understood that the embodiments are not to be limited to the specific ones disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims.

Although specific terms are employed herein, they are used in a generic and descriptive sense only and not for purposes of limitation.

What is claimed is:

1. A method comprising:

causing display of a first portion of data provided by a time-based application, wherein the first portion of data is arranged at a first perceived depth in a three-dimensional presentation, and the first portion of data is one of a plurality of portions of data;

causing display of a plurality of relevance category icons arranged within the three-dimensional presentation, wherein the plurality of relevance category icons are defined relevance categories to broaden or lessen the plurality of portions of data displayed within the three-dimensional presentation;

receiving first data navigation instructions for navigating the plurality of portions of data in a first dimension or a second dimension via a first user interface device configured for user input;

in response to at least receiving the first data navigation instructions, causing the plurality of portions of data to be presented with respect to a particular temporal unit selected from a group comprising one of a month, day, or time and causing the plurality of portions of data to be presented with respect to a particular relevance category icon selected;

receiving second data navigation instructions for navigating the plurality of portions of data in a third dimension by modifying a depth aspect such that perceived depth of the plurality of portions data is modified, the depth aspect has an associated temporal characteristic within a duration of the temporal unit, the navigating the plurality of portions of data in the third dimension is based on a supplemental user input to a second user interface device, the supplemental user input comprising a movement substantially orthogonal to the first user interface device configured for user input, wherein the second user interface device is on a second plane that is different from a first plane of the first user interface device; and in response to at least receiving the second data navigation instructions, causing the three-dimensional presentation of the plurality of portions of data to be modified within the third dimension, wherein modifying the data in the third dimension comprises causing display of a second portion of data of the plurality of portions of data at a second perceived depth in the three-dimensional presentation, the second portion of data identified by the time-based application based on a calculated relevance with respect to a time associated with the second portion of data, wherein the time associated with the second portion of data is defined within the duration of the temporal unit.

2. The method of claim 1, wherein the second plane is substantially orthogonal to the first plane.

3. The method of claim 1, wherein receiving the first data navigation instructions includes receiving the first user navigation instructions via the first user interface device, the first user interface device being a touch screen display disposed on a front surface of an electronic device; and wherein receiving the second data navigation instructions includes receiving the second user navigation instructions via the second user interface device, the second user interface device being a touch sensitive stripe, a roller wheel, a trackball, optical trackpad, a two-way slider, or rocker button disposed on a side edge surface of the electronic device.

4. The method of claim 1, wherein the second portion of e-data is identified based on a sequential navigation of the plurality of portions of data.

5. The method of claim 1, further comprising:

receiving third data navigation instructions for navigating the plurality of portions of data in the third dimension via the second user interface device, wherein the third data navigation instruction comprise an indication of a movement in a direction substantially opposite to a direction of the second data navigation instructions; and in response to receiving the third data navigation instructions, causing the first portion of data to be redisplayed and the second portion of data to no longer be displayed.

6. An apparatus comprising:

at least one processor; and at least one memory comprising computer program code, the at least one memory and the computer program code configured to, with the at least one processor, cause the apparatus at least to:

cause display of a first portion of data provided by a time-based application, wherein the first portion of data is arranged at a first perceived depth in a three-dimensional presentation, and the first portion of data is one of a plurality of portions of data;

cause display of a plurality of relevance category icons arranged within the three-dimensional presentation, wherein the plurality of relevance category icons are defined relevance categories to broaden or lessen the plurality of portions of data displayed within the three-dimensional presentation;

receive first data navigation instructions for navigating the plurality of portions of data in a first dimension or a second dimension via a first user interface device configured for user input;

in response to at least receiving the first data navigation instructions, causing the plurality of portions of data to be presented with respect to a particular temporal unit selected from a group comprising one of a month, day, or time and causing the plurality of portions of data to be presented with respect to a particular relevance category icon selected;

receive second data navigation instructions for navigating the plurality of portions of data in a third dimension by modifying a depth aspect such that perceived depth of the plurality of portions of data is modified, the depth aspect has an associated temporal characteristic within a duration of the temporal unit, the navigating the plurality of portions of data in the third dimension is based on a supplemental user input to a second user interface device, the supplemental user input comprising a movement substantially orthogonal to the first user interface device configured for user input, wherein the second user interface device is on a surface different from a surface of the first user interface device; and in response to at least receiving the second data navigation instructions, cause the three-dimensional presentation of the plurality of portions of data to be modified within the third dimension, wherein modifying the plurality of portions of data in the third dimension comprises causing display of a second portion of data at a second perceived depth in the three-dimensional presentation, the second portion of the data identified by the time-based application based on a calculated relevance with respect to a time associated with the second portion of the data, wherein the time associated with the second portion of data identified is defined within the duration of the temporal unit.

7. The apparatus of claim 6, wherein the apparatus caused to receive the first data navigation instructions includes being configured to receive the first user navigation instructions via the first user interface device, the first user interface device being a touch screen display disposed on a front surface of an electronic device; and wherein the apparatus caused to receive the second data navigation instructions includes being caused to receive the second user navigation instructions via the second user interface device, the second user interface device being a touch sensitive stripe, a roller wheel, a trackball, optical trackpad, a two-way slider, or a rocker button disposed on a side edge surface of the electronic device.

8. A computer program product comprising at least one non-transitory computer readable medium having program code stored thereon, wherein the program code, when executed by an apparatus, causes the apparatus at least to:

cause display of a first portion of data provided by a time-based application, wherein the first portion of data is arranged at a first perceived depth in a three-dimensional presentation, and the first portion of data is one of a plurality of portions of data, wherein the first portion of data is arranged at a first perceived depth, and the first portion of data is one of a plurality of portions of data;

cause display of a plurality of relevance category icons arranged within the three-dimensional presentation, wherein the plurality of relevance category icons are defined relevance categories to broaden or lessen the plurality of portions of data displayed within the three-dimensional presentation;

receive first data navigation instructions for navigating the plurality of portions of data in a first dimension or a second dimension via a first user interface device configured for user input;

in response to at least receiving the first data navigation instructions, causing the plurality of portions of data to be presented with respect to a particular temporal unit selected from a group comprising one of a month, day, or time and causing the plurality of portions of data to be presented with respect to a particular relevance category icon selected;

receive second data navigation instructions for navigating the plurality of portions of data in a third dimension by modifying a depth aspect such that perceived depth of the plurality of portions of data is modified, the depth aspect has an associated temporal characteristic within a duration of the temporal unit, the navigating the plurality of portions of data in the third dimension is based on a supplemental user input to a second user interface device, the supplemental user input comprising a movement substantially orthogonal to the first user interface device configured for user input, wherein the second user interface device is on a surface different from a surface of the first user interface device; and in response to at least receiving the second data navigation instructions, cause the three-dimensional presentation of the plurality of portions of data to be modified within the third dimension, wherein modifying the data in the third dimension comprises causing display of a second portion of data plurality of portions of at a second perceived depth in the three-dimensional presentation, the second portion of data identified by the time-based application based on a calculated relevance with respect to a time associated with the second portion of data, wherein the time associated with the second portion of data identified is defined within the duration of the temporal unit.

9. The computer program product of claim 8, wherein the program code that causes the apparatus to receive the first data navigation instructions also causes the apparatus to receive the first user navigation instructions via the first user interface device, the first user interface device being a touch screen display disposed on a front surface of an electronic device; and wherein the program code that causes the apparatus to receive the second data navigation instructions also causes the apparatus to receive the second user navigation instructions via the second user interface device, the second user interface device being a touch sensitive stripe, a roller wheel, a trackball, optical trackpad, a two-way slider, or a rocker button disposed on a side edge surface of the electronic device.

* * * * *

UNITED STATES PATENT AND TRADEMARK OFFICE
CERTIFICATE OF CORRECTION

PATENT NO. : 10,969,833 B2  
APPLICATION NO. : 13/089870  
DATED : April 6, 2021  
INVENTOR(S) : Cheng Page 1 of 1

It is certified that error appears in the above-identified patent and that said Letters Patent is hereby corrected as shown below:

In the Claims

Column 14,
Lines 4 and 5, "portion of e-data" should read --portion of data--.

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*